(12) United States Patent  
Nam

(10) Patent No.: US 11,100,016 B2  
(45) Date of Patent: Aug. 24, 2021

(54) DATA STORAGE DEVICE, DATA PROCESSING SYSTEM, AND ACCELERATION DEVICE THEREFOR

(71) Applicant: SK hynix Inc., Icheon (KR)

(72) Inventor: Ji Hoon Nam, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/705,107

(22) Filed: Dec. 5, 2019

(65) Prior Publication Data

US 2021/0011860 A1 Jan. 14, 2021

(30) Foreign Application Priority Data

Jul. 8, 2019 (KR) .................. 10-2019-0082000

(51) Int. Cl.
*G06F 13/16* (2006.01)
*G06N 3/04* (2006.01)
*G06F 9/50* (2006.01)

(52) U.S. Cl.
CPC ........ *G06F 13/1668* (2013.01); *G06F 9/5094* (2013.01); *G06N 3/04* (2013.01); *G06N 3/0445* (2013.01)

(58) Field of Classification Search
CPC ..... G06F 13/1668; G06F 9/5094; G06N 3/04; G06N 3/0445
See application file for complete search history.

(56) References Cited

U.S. PATENT DOCUMENTS

| 10,893,096 | B2* | 1/2021 | Bivens | H04L 67/1097 |
| 2012/0304024 | A1* | 11/2012 | Rohleder | G06F 9/38 |
| | | | | 714/49 |
| 2019/0101974 | A1* | 4/2019 | Guim Bernat | G06F 3/067 |
| 2020/0125505 | A1* | 4/2020 | Brox | G11C 7/1084 |

FOREIGN PATENT DOCUMENTS

| KR | 20130110459 A | 10/2013 |
| KR | 101699104 B1 | 1/2017 |
| KR | 20170124017 A | 11/2017 |

* cited by examiner

*Primary Examiner* — Nimesh G Patel

(57) ABSTRACT

A data processing system includes a host device and a data storage device. The host device is configured to select a speed mode of a memory bandwidth based on a network model, or a batch size, or both. The data storage device includes an accelerator configured to change a structure of a processing element (PE) array by controlling transmission paths of first input data and second input data that are input to the PE array based on the speed mode of the memory bandwidth. Computing power and memory power of the accelerator are adjusted according to the selection of the speed mode.

26 Claims, 15 Drawing Sheets

DATA STORAGE DEVICE, DATA PROCESSING SYSTEM, AND ACCELERATION DEVICE THEREFOR

CROSS-REFERENCE TO RELATED APPLICATION

The present application claims priority under 35 U.S.C. § 119(a) to Korean Patent Application Number 10-2019-0082000, filed on Jul. 8, 2019, in the Korean Intellectual Property Office, which is incorporated herein by reference in its entirety.

BACKGROUND

1. Technical Field

Various embodiments relate to a data storage device, a data processing system, and an acceleration device therefor.

2. Related Art

An artificial intelligence (AI) accelerator may be an application capable of maximizing performance of a related operation, while reducing burden of a host in performing an operation and utilizing resource, by implementing applications, such as multi-layer perception (MLP), long short term memory (LSTM), and a convolutional neural network (CNN), which have been processed in software, using hardware.

The AI accelerator may have high power consumption. In this case, the power used in the AI accelerator may be divided into computing power and memory power. In general, the memory power may increase as a memory bandwidth increases.

In deep learning, major applications may be determined depending on a network model. For example, the CNN may be an application that requires relatively many calculators, and each of the MLP and LSTM may be an application that requires a large memory bandwidth.

SUMMARY

Various embodiments are directed to an acceleration device for flexibly adjusting memory power and computing power depending on a memory bandwidth, and a data processing system including the acceleration device.

In an embodiment, a data processing system includes a host device configured to select a speed mode of a memory bandwidth based on a network model, or a batch size, or both, computing power and memory power of an accelerator being adjusted according to the selection of the speed mode; and a data storage device comprising the accelerator configured to change a structure of a processing element (PE) array by controlling transmission paths of first input data and second input data that are input to the PE array based on the speed mode of the memory bandwidth, wherein the memory power in a total power budget is increased from an initial value of the memory power if a first speed mode is selected and the computing power in the total power budget is increased from an initial value of the computing power if a second speed mode is selected.

In an embodiment, an acceleration device includes an accelerator configured to change a structure of a processing element (PE) array by controlling transmission paths of first input data and second input data that are input to the PE array based on a speed mode of a memory bandwidth.

The accelerator may include a PE array including a first PE group and a second PE group, each of the first and second PE groups including a plurality of PEs arranged in first and second directions; a PE array adaptive block positioned between the first PE group and the second PE group in the PE array and configured to selectively input first input data of a first data group or first input data of a second data group to the second PE group in the first direction within the PE array and to selectively input second input data of a third data group or second input data of a fourth data group to the second PE group in the second direction within the PE array.

In an embodiment, a data storage device includes a central processing unit (CPU) configured to select a speed mode of a memory bandwidth based on a network model, a batch size, or both, computing power and memory power of an accelerator being adjusted according to the selection of the speed mode; and an accelerator configured to change a structure of a processing element (PE) array by controlling transmission paths of first input data and second input data that are input to the PE array based on the speed mode of the memory bandwidth, wherein the memory power in a total power budget is increased from an initial value of the memory power if a first speed mode is selected and the computing power in the total power budget is increased from an initial value of the computing power if a second speed mode is selected.

DETAILED DESCRIPTION

Hereinafter, a data storage device, a data processing system, and an acceleration device therefor will be described below with reference to the accompanying drawings through various examples of embodiments.

Figure 1:
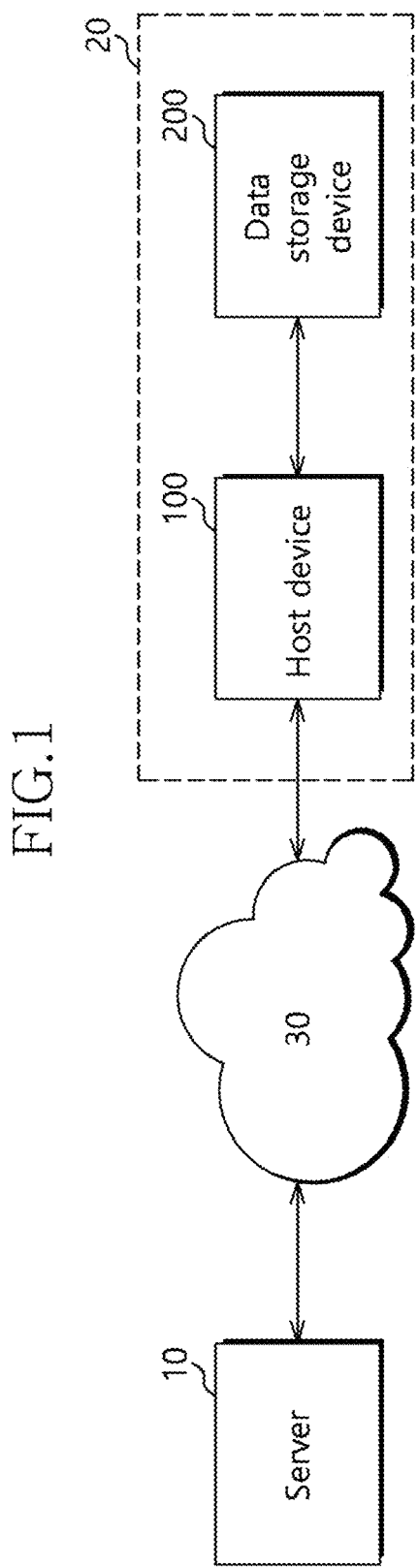
FIG. 1 illustrates a connection relation between a data processing system and an external server according to an embodiment.
Figure 2:
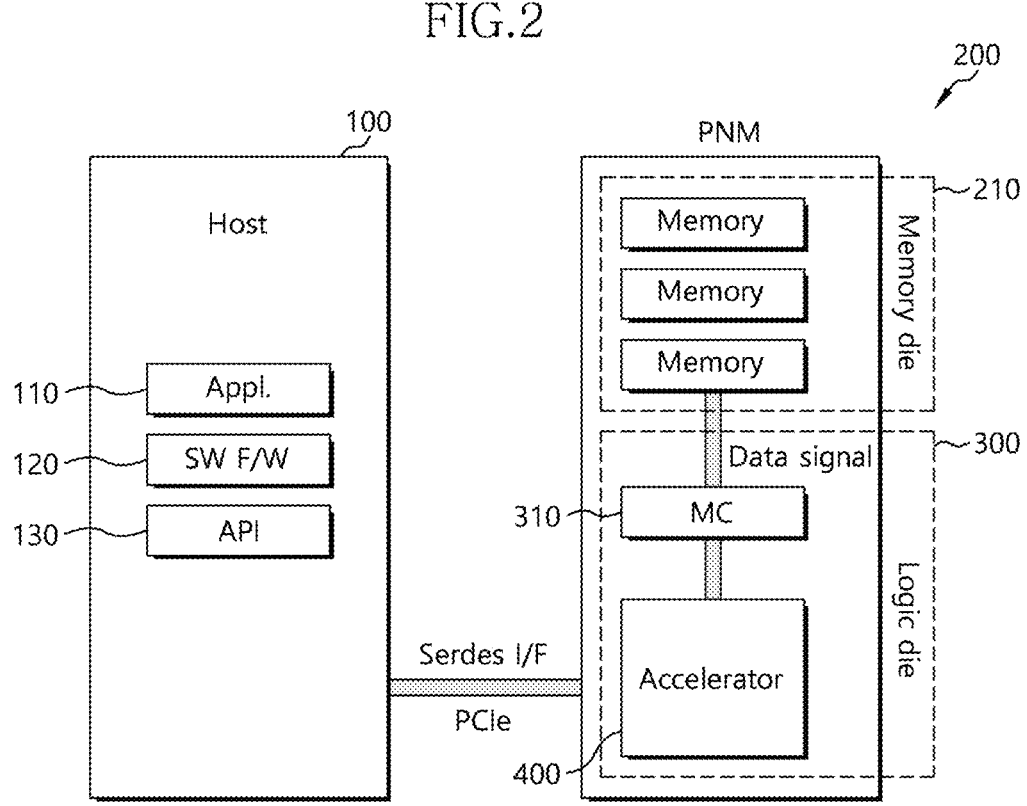
FIG. 2 illustrates a data processing system according to an embodiment.

FIG. 1 illustrates a connection relation between a data processing system 20 and an external server 10 according to an embodiment. FIG. 2 illustrates the data processing system 20 shown in FIG. 1 according to an embodiment.

Hereinafter, embodiments will be described with reference to FIG. 3 that illustrates a method of determining or selecting a speed mode in a host device according to an embodiment, FIG. 4 that illustrates a total power budget according to an embodiment, and FIGS. 5A and 5B that illustrate the adjustment of memory power and computing power according to an embodiment.

Referring to FIG. 1, the data processing system 20 may be electrically coupled to the external server 10 over a network 30, and may receive data from the external server 10. In this case, the data may include a batch size to be described later. A deep learning application may process data in a unit of a batch (or a batch unit).

A size of a batch (or a batch size) may correspond to the number of data that the data processing system 20 can process at a time. For example, if first input data is photo image data, the number of photo images included in the first input data may be called the batch size. 10 batches indicate that 10 photo images are used as the first input data. 10 first input data perform a multiplication and accumulation (MAC) operation along with the same number of second input data, e.g., 10 second input data.

The data processing system 20 may include a host device 100 and a data storage device 200.

Referring to FIG. 2, the host device 100 may include an application 110, software firmware (SW F/W) 120, and an application programming interface (API) 130. The data storage device 200 may be processing-near-memory (PNM). The PNM may include at least one memory die 210 and a logic die 300 that are incorporated in an advanced integrated circuit (IC) package.

The SW F/W 120 of the host device 100 may determine or select a speed mode of a memory bandwidth based on at least one of a network model and a batch size so that computing power and memory power of an accelerator 400 included in the data storage device 200 are adjusted.

Figure 3:
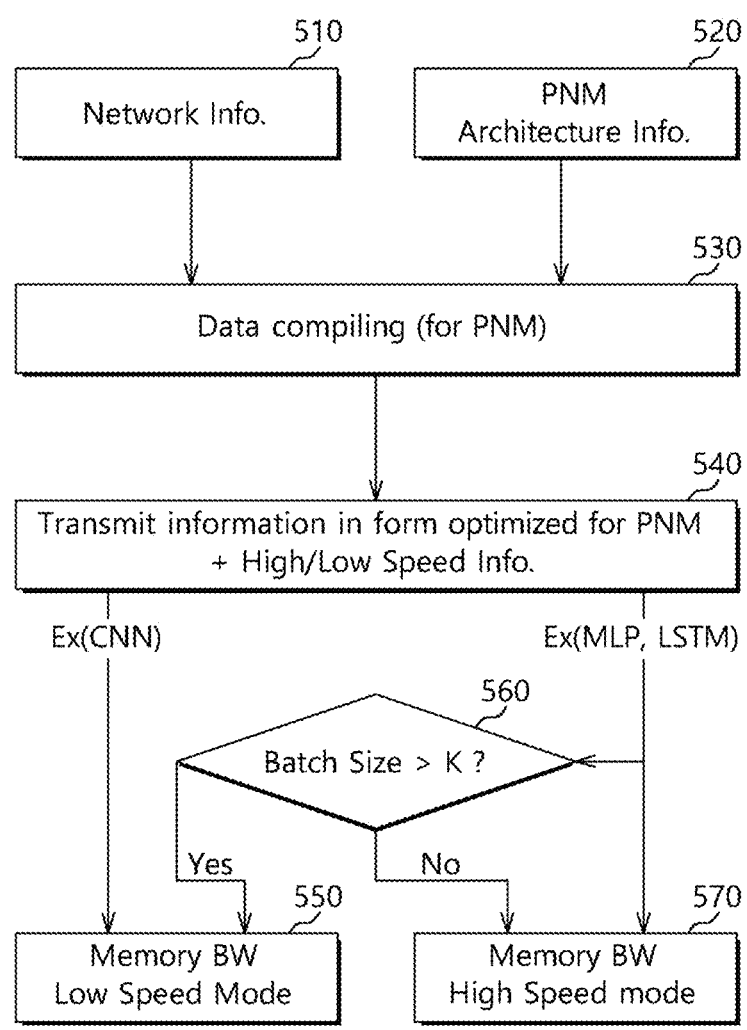
FIG. 3 illustrates a method of determining a speed mode in a host device according to an embodiment.

Referring to FIG. 3, the host device 100 may perform a data compiling operation based on network model information including hardware architecture information, such as network information 510 and processing-near-memory (PNM) architecture information 520 (530). In this case, the host device 100 performs a compiling operation for a PNM in order to perform power sharing. Specifically, the host device 100 additionally performs compiling for adjusting memory power and computing power in a total power budget to be described later in addition to the existing compiling for only an accelerator.

The PNM may have a relatively higher speed than a data pin structure of a high bandwidth memory (HBM) because a data signal line of the memory die 210 is electrically coupled to the logic die 300 in the PNM. This is because a speed restriction on an off-chip connection has been removed in the PNM by incorporating the memory die 210 and the logic die 300 in the advanced IC package.

The network 30 of FIG. 1 may be a neural network, but is not limited thereto. The neural network may include a convolutional neural network (CNN)), multi-layer perception (MLP), long short term memory (LSTM), or the like. Network information may be recognized in advance by the host device 100.

The PNM architecture information 520 may include accelerator architecture information, power per calculator, power per memory bandwidth (BW), information on a maximum structure of calculators, and information on a maximum structure of memory BW.

In this case, the maximum structure of calculators may represent the maximum number of calculators. The maximum structure of memory BW may represent a maximum size of the memory BW. The maximum structure of calculators and the maximum structure of memory BW are pre-determined. In embodiments of the present disclosure, the number of calculators and the size of memory BW may be changed within the pre-determined maximum structures.

For example, when there are N calculators, the number of calculators allocated cannot exceed N, and when the maximum size of memory BW is M, the size of a memory BW allocated cannot exceed M, N and M being positive integers. Accordingly, the maximum structures of the calculators and the memory BW are provided in advance to determine or select a speed mode of the memory BW based on the maximum structure of calculators and the maximum structure of memory BW.

The host device 100 may output data compiled in a form optimized for the PNM including the speed mode of the memory BW (540). In this case, the speed mode of the memory BW may include a low speed mode and a high speed mode.

Figure 4:
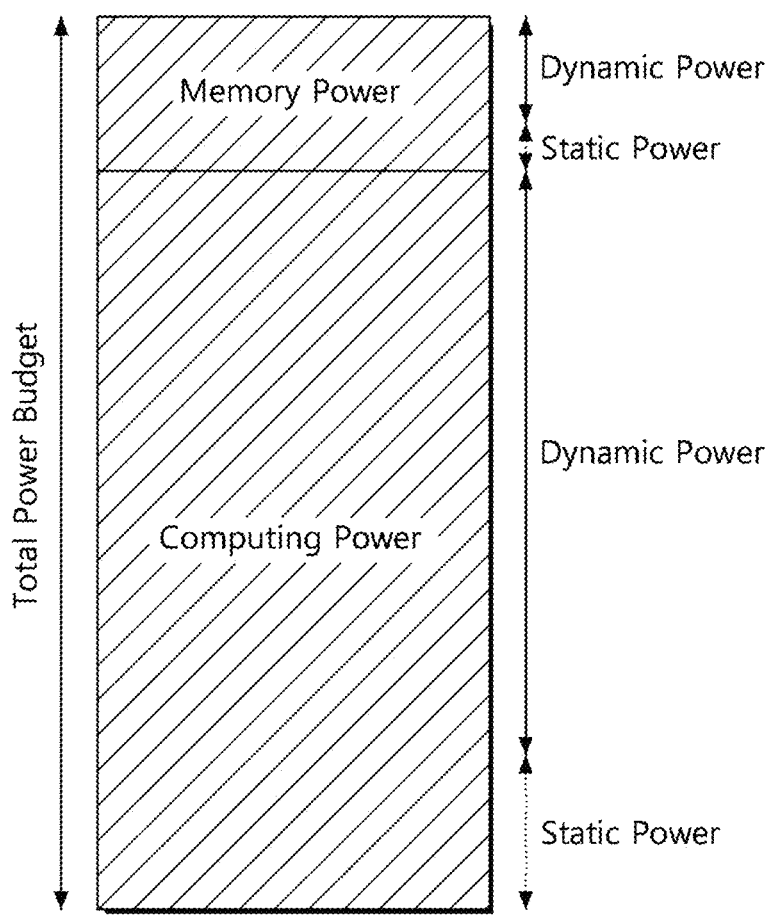
FIG. 4 illustrates a total power budget according to an embodiment.
Figure 5A:
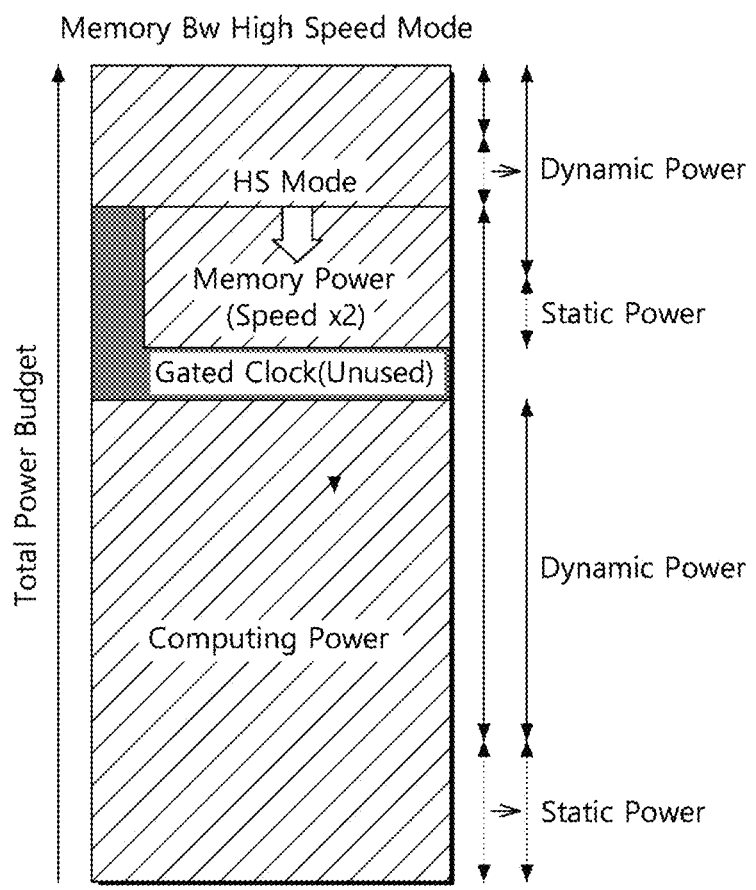
FIGS. 5A and 5B illustrate the adjustment of memory power and computing power according to an embodiment.
Figure 5B:
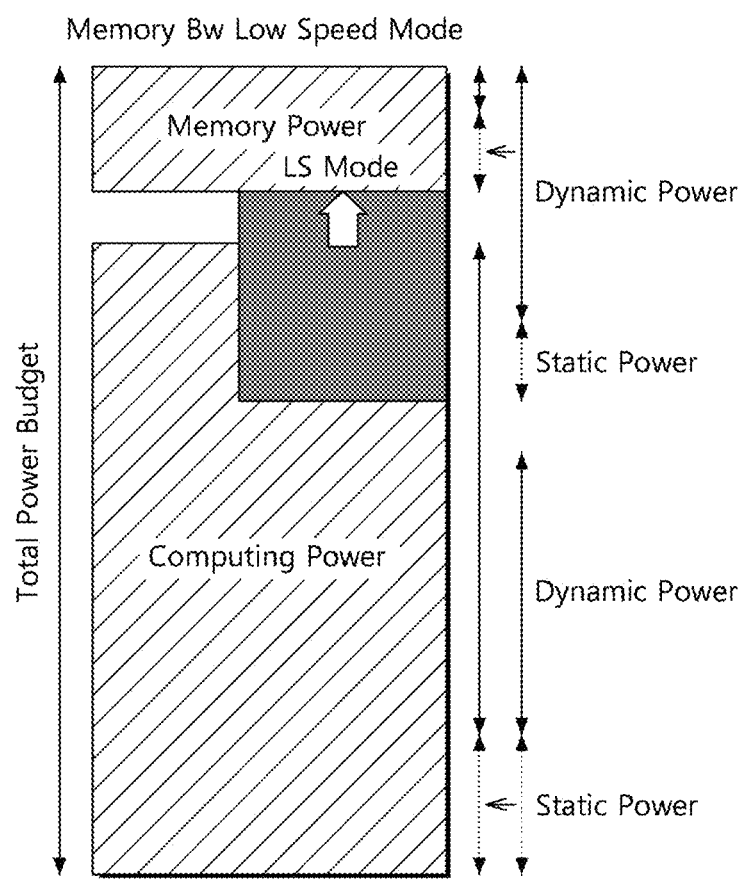

Referring to FIG. 4, the total power budget may include memory power and computing power. In this case, each of the memory power and the computing power may include an adjustable dynamic power portion and a static power portion. FIG. 4 illustrates a case where the memory power and the computing power are maximally used.

The speed mode of the memory BW may include the high speed mode and the low speed mode. In the high speed mode illustrated in FIG. 5A, the memory power is increased from an initial setting reference value. In the low speed mode illustrated in FIG. 5B, the computing power is increased from an initial setting reference value.

Referring back to FIG. 3, when a network model is the CNN, the host device 100 may determine the speed mode of the memory BW as the low speed mode (550). When the network model is the CNN, data is re-used relatively a lot in the logic die 300, and thus the host device 100 determines the speed mode of the memory BW as the low speed mode because total performance of the data processing system 20 is determined by performance of the computing power although the memory BW is low.

On the other hand, when the network model is any one of the MLP and the LSTM, the host device 100 may examine the batch size and compare the batch size with a reference value K (560). If the batch size exceeds the reference value K (i.e., the batch size >K), the host device 100 may determine the speed mode of the memory BW as the low speed mode (550). If the batch size is equal to or less than the reference value K, the host device 100 may determine the speed mode of the memory BW as the high speed mode (570).

Although the network model is the MLP or the LSTM, a need for greater computing power may be increased when the batch size increases. Accordingly, the host device 100 compares the batch size with the reference value K although the network model is the MLP or the LSTM.

In this case, the batch size may be received from the external server 10 and included in the PNM architecture information. In a network model, such as the MLP, LSTM, or a recurrent neural network (RNN), in which no data is re-used in the logic die 300, the host device 100 may determine the speed mode of the memory BW as the high speed mode because the memory BW may be a main factor to determine the total performance of the data processing system 20.

Referring back to FIG. 2, the logic die 300 may include a memory controller (MC) 310 and the accelerator 400.

Figure 11:
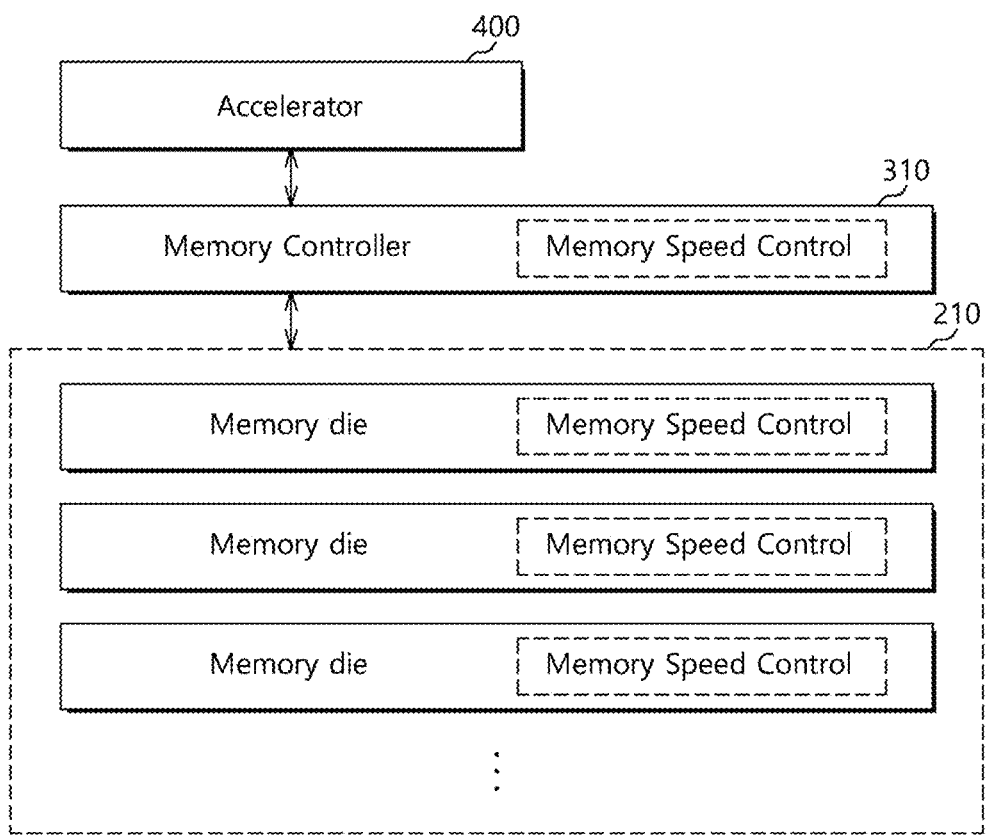
FIG. 11 illustrates a connection relation between a memory controller and a memory die according to an embodiment.

Referring to FIG. 11 that illustrates a connection relation between the MC 310 and the memory die 210 according to an embodiment, the MC 310 may transmit the speed mode of the memory BW to the memory die 210.

The memory die 210 may change a clock of a memory based on the speed mode of the memory BW transmitted by the MC 310. In this case, the number of memory dies 210 included in the data storage device 200 may be at least one.

In another embodiment, the MC 310 may change the clock of the memory based on the speed mode of the memory BW.

Figure 6:
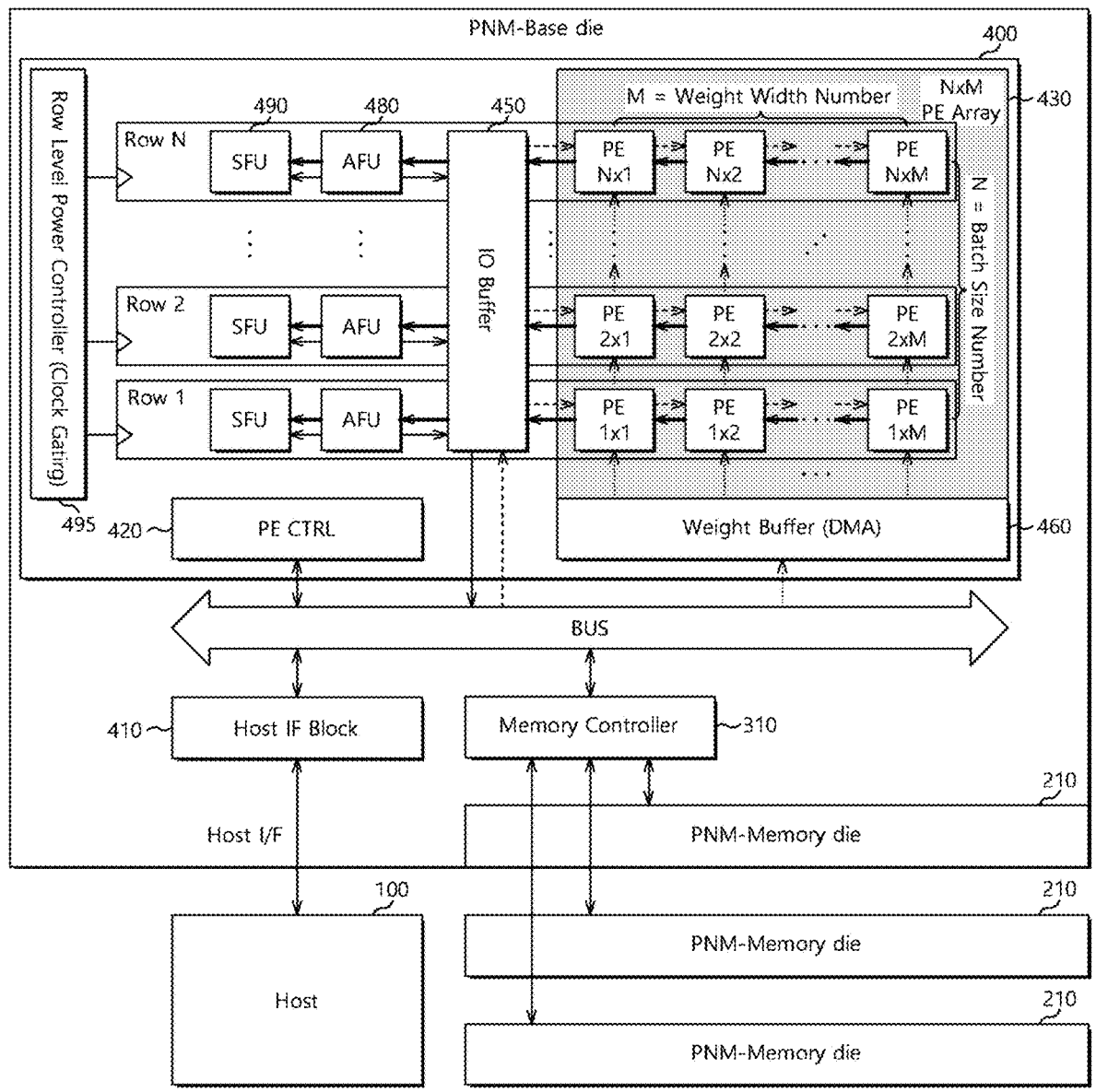
FIG. 6 illustrates a data storage device according to an embodiment.

FIG. 6 illustrates a data storage device according to an embodiment.

Figure 7:
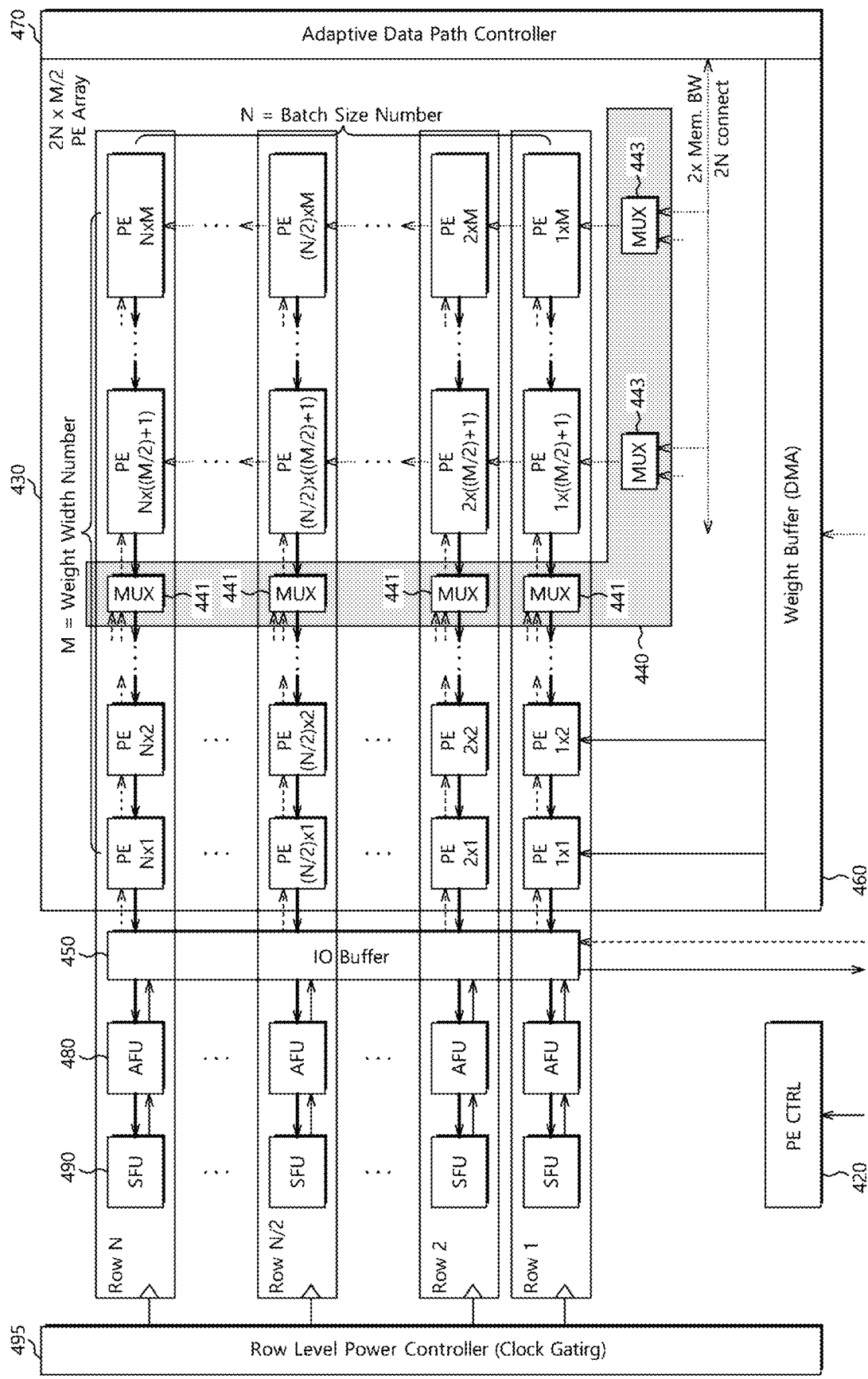
FIG. 7 illustrates an accelerator according to an embodiment.
Figure 8:
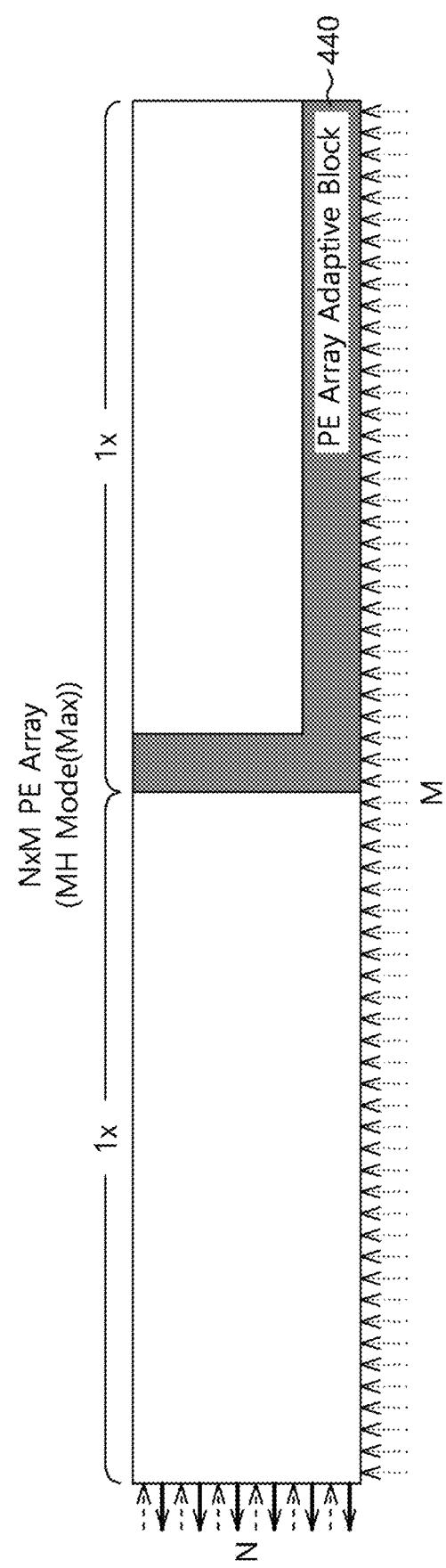
FIG. 8 illustrates a PE array according to an embodiment.
Figure 9:
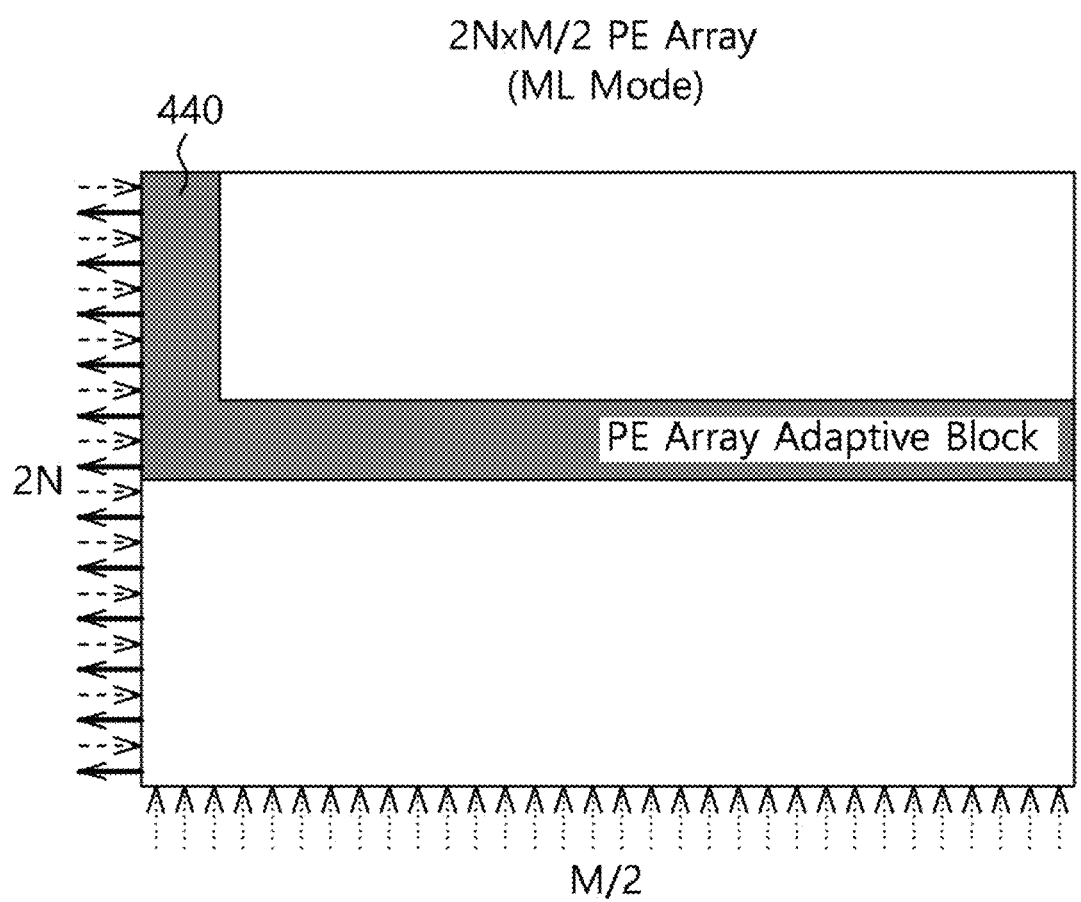
FIG. 9 illustrates a PE array according to another embodiment.
Figure 10:
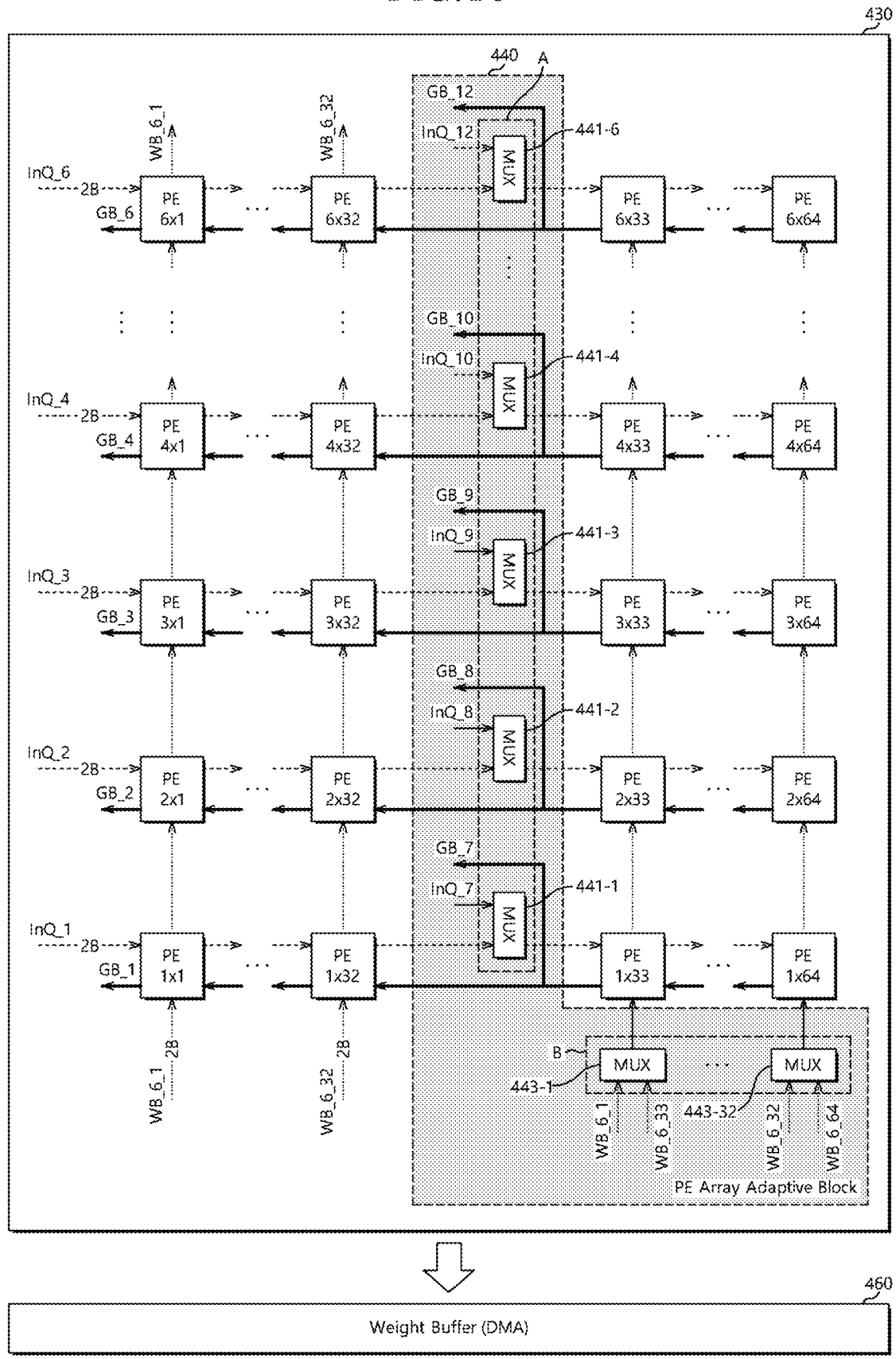
FIG. 10 illustrates a PE array structure according to an embodiment.
Figure 12:
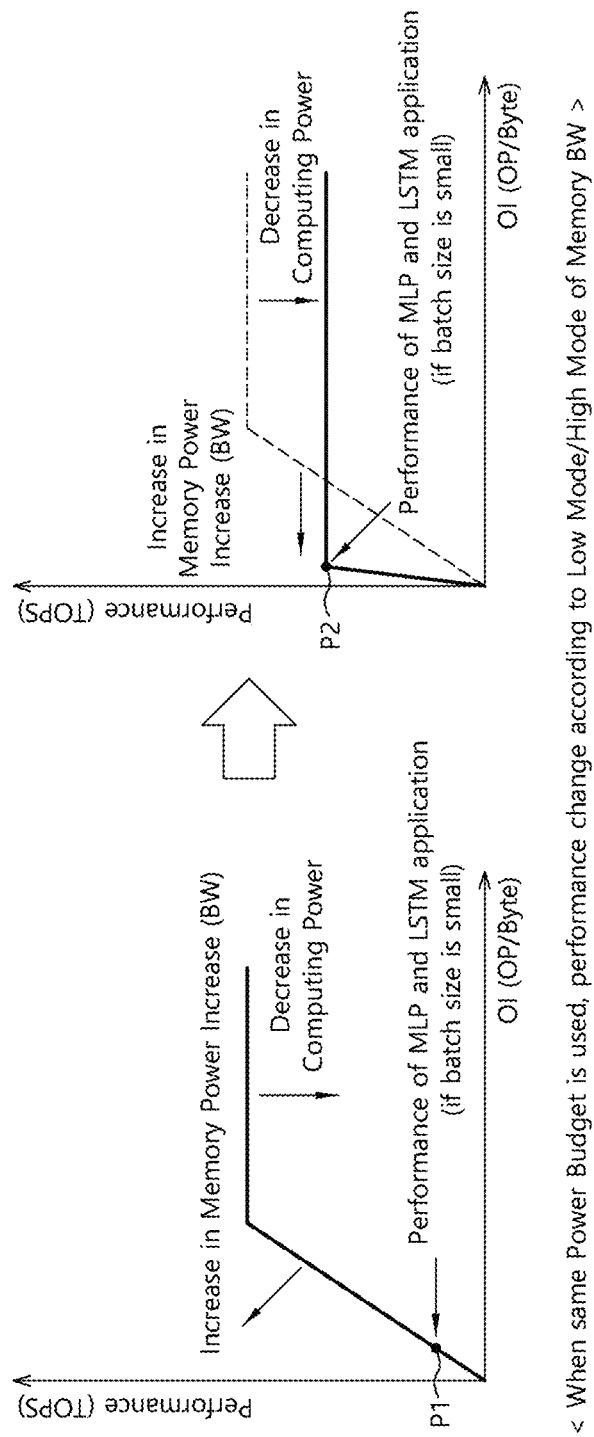
FIG. 12 illustrates a performance change according to a speed mode.

The data storage device shown in FIG. 6 will be described below with reference to FIGS. 7 to 12. FIG. 7 illustrates an accelerator according to an embodiment. Each of FIGS. 8 and 9 illustrate a PE array according to an embodiment. FIG. 10 illustrates a PE array structure according to an embodiment. FIG. 11 illustrates a connection relation between an MC and a memory die according to an embodiment. FIG. 12 illustrates a performance change according to a speed mode.

The data storage device shown in FIG. 6 may correspond to the data storage device 200 shown in FIG. 2.

Referring to FIG. 6, the data storage device 200 may include an accelerator 400 configured to change a structure of a processing element (PE) array 430 by controlling a transmission path of first input data and second input data of the PE array 430 depending on a speed mode of a memory BW.

The accelerator 400 may receive the first input data and the second input data, multiply the first input data and the second input data, and add the multiplied data to previously stored data. In this case, the second input data may be weight data.

Referring to FIG. 6, the first input data may be transmitted in a row direction, and the second input data may be transmitted in a column direction. The resulting data obtained by adding the multiplied data to the previously stored data includes all the second input data and the first input data that are necessary for a node, and is transmitted through an IO buffer 450. After the MAC is performed on the resulting data, an activation function unit (AFU) 480 performs an activation function on the data transmitted through the IO buffer 450 to thereby provide output data.

Referring to FIGS. 6 and 7, the accelerator 400 may include a PE controller (PE CTRL) 420, the PE array 430, a PE array adaptive block 440, the IO buffer 450, a weight buffer 460, an adaptive data path controller 470, the activation function unit (AFU) 480, a special function unit (SFU) 490, and a row level power controller 495.

The accelerator 400 may communicate with the host device 100 through a host interface (IF) block 410. In this case, the host IF block 410 may provide interfacing between the host device 100 and the data storage device 200 using a protocol of the host device 100. For example, the host IF block 410 may communicate with the host device 100 using a Serdes interface protocol, but the protocol is not limited thereto. The host IF block 410 may communicate with the host device 100 using any one of protocols such as PCI express (PCI-E), a universal serial bus (USB), a universal flash storage (UFS), a multimedia card (MMC), a parallel advanced technology attachment (PATA), a serial advanced technology attachment (SATA), a small computer system interface (SCSI), a serial attached SCSI (SAS), a peripheral component interconnection (PCI), and the like.

The PE controller 420 may transmit a speed mode of a memory BW, transmitted by the host device 100, to the adaptive data path controller 470. As illustrated in FIG. 6, the PE controller 420 may receive the speed mode of the memory BW, transmitted by the host device 100, through the host IF block 410 that transmits and receives data to and from the host device 100.

Referring to FIG. 7, the PE array 430 may include a plurality of first PE groups, each first PE group including a multiplicity of PEs arranged in the row direction. The PE array adaptive block 440 may include a plurality of first multiplexers that are positioned between PEs in the PE array 430, and each first multiplexer may selectively input any one of first input data of a corresponding data group and first input data of another data group to PEs in the row direction within the PE array 430.

Furthermore, the PE array 430 may include a plurality of second PE groups, each second PE group including a multiplicity of PEs arranged in the column direction. The PE array adaptive block 440 may include a plurality of second multiplexers that are coupled to PEs in the PE array 430, and each second multiplexer may selectively input any one of second input data of a corresponding data group and second input data of another data group to PEs in the column direction within the PE array 430.

In FIG. 6, the PE array 430 may have an N×M structure, i.e., the PE array 430 may include N×M PEs. In this case, N may be a batch size, and M may represent a weight width. That is, N may represent a size of rows in which the first input data is input, and M may represent a size of columns in which the second input data is input. Therefore, in this embodiment, the PE array 430 may include N first PE groups and M second PE groups. Each first PE group may include M PEs arranged in the row direction, and each second PE group includes N PEs arranged in the column direction.

Referring to FIGS. 7 and 10, the PE array adaptive block 440 may be positioned in a memory BW unit (e.g., a 1× unit) between PEs in the PE array 430, wherein a first PE array adaptive block is positioned in front of a second memory BW.

For example, if a memory BW is a 2× BW, the PE array adaptive block 440 may be positioned at the front end of a PE corresponding to the 2× BW. In this case, as illustrated in FIG. 10, the PE array adaptive block 440 may include a row group A and a column group B.

Referring to FIG. 7, the PE array adaptive block 440 may include a plurality of first multiplexers 441 included in the row group A for inputting first input data to PEs and a plurality of second multiplexers 443 included in the column group B for inputting second input data to the PEs.

The plurality of first multiplexers 441 may be matched in a row unit of the PE array 430, and the plurality of second multiplexers 443 may be matched in a column unit of the PE array 430.

FIG. 10 shows the PE array 430 that includes the PE array adaptive block 440 when N is 6 and M is 64. Referring to FIG. 10, the multiplexer 441-1 of the plurality of first multiplexers 441 may input any one of first input data InQ_1 and InQ_7 to a 1×33 PE under the control of the adaptive data path controller 470 in FIG. 7.

The multiplexer 443-1 of the plurality of second multiplexers 443 may input any one of second input data WB_6_1 and WB_6_33 to the 1×33 PE under the control of the adaptive data path controller 470.

The IO buffer 450 may transmit first input data to PEs in the row direction within the PE array 430.

The weight buffer 460 may transmit second input data to PEs in the column direction within the PE array 430.

Although not illustrated in drawings, the IO buffer 450 and the weight buffer 460 may be implemented into one element or electrically coupled to each other by a bus.

The adaptive data path controller 470 may control the PE array adaptive block 440 based on a speed mode of a memory BW.

FIG. 8 illustrates the PE array 430 that has an N×M structure as an initial structure, and FIG. 9 illustrates the PE array 430 that has a 2N×M/2 structure as an initial structure.

Therefore, if the PE array 430 has the initial structure of the N×M structure as illustrated in FIG. 8, a memory BW is 2×, and the speed mode of the memory BW is a low speed mode, the adaptive data path controller 470 may control input paths of the first input data and the second input data so that the structure of the PE array 430 is changed from the N×M structure to the 2N×M/2 structure. In this case, N may be a batch size, and M may represent a weight width.

Specifically, the adaptive data path controller 470 may control the plurality of first multiplexers 441 to receive the first input data from a second N data group of two or more N data groups when PEs in a left N×M/2 structure of FIG. 8 receive the first input data from a first N data group of the 2N data groups, and may control the plurality of second multiplexers 443 to receive the second input data from an M/2 data group when the PEs in the left N×M/2 structure of FIG. 8 receive the second input data from the M/2 data group. Herein, each of the first and second data groups may include N first input data, and the M/2 data group may include M/2 second input data.

For example, as illustrated in FIG. 8, if the PE array 430 has the initial structure of the N×M structure and the memory BW is 2×, the initial structure of the PE array 430 may have a memory structure of 6×64 as illustrated in FIG. 10. In this case, the PE array adaptive block 440 may be positioned between a first 1× stage and a second 1× stage (or a 2× stage). The first 1× stage corresponds to the left N×M/2 structure, and the second 1× stage corresponds to a right N×M/2 structure.

If the speed mode of the memory BW is a low speed mode, the adaptive data path controller 470 may change the structure of the PE array 430 from 6×64 (refer to FIG. 8) to 12×32 (refer to FIG. 9).

Referring to FIG. 10, the adaptive data path controller 470 may control the plurality of first multiplexers 441 so that the 1×33 PE to the 6×33 PE arranged in the column direction receive first input data InQ_7 to InQ_12, respectively.

In addition, the adaptive data path controller 470 may control the plurality of second multiplexers 443 so that the 1×33 PE to the 1×64 PE arranged in the row direction receive second input data WB_6_1 to WB_6_31, respectively.

That is, the 1×33 PE to the 6×33 PE arranged in the column direction receive the first input data InQ_7 to InQ_12, respectively, not the first input data InQ_1 to InQ_6. The 1×33 PE to the 1×64 PE arranged in the row direction receive the second input data WB_6_1 to WB_6_32, respectively, not the second input data WB_6_33 to WB_6_64. Accordingly, the PEs in the PE array 430 can implement a PE array structure of 12×32 by adjusting the input paths of the first and second input data.

In contrast, as illustrated in FIG. 9, if the initial structure of the PE array 430 is the 2N×M/2 structure, the memory BW is 2×, and a speed mode of the memory BW is a high speed mode, the adaptive data path controller 470 may control the input paths of the first input data and the second input data so that the structure of the PE array 430 is changed from the 2N×M/2 structure to the N×M structure.

In FIG. 9, the PE array adaptive block 440 may be positioned between a first 1× stage and a second 1× stage (or a 2× stage). The first 1× stage corresponds to a lower N×M/2 structure, and the second 1× stage corresponds to an upper N×M/2 structure.

The adaptive data path controller 470 may control the plurality of first multiplexers 441 to receive the first input data from the first N data group of the two or more N data groups when PEs in the lower N×M/2 structure of FIG. 9 receive the first input data from the first N data group of the two or more N data groups, and may control the plurality of second multiplexers 443 to receive the second input data from a next M/2 data group following a first M/2 data group of second input data when the PEs in the lower N×M/2 structure of FIG. 9 receive the second input data from the first M/2 data group.

For example, referring to FIG. 10, when the upper N×M/2 structure of FIG. 9 includes the 1×33 PE to the 6×33 PE, . . . , and the 1×64 PE to the 6×64 PE, the first input data InQ_1 to InQ_6 may be input to the 1×33 PE to the 6×33 PE arranged in the column direction, and the second input data WB_6_33 to WB_6_64 may be input to the 1×33 PE to the 1×64 PE arranged in the row direction.

Referring back to FIG. 7, the activation function unit (AFU) 480 may be provided in each row of the PE array 430 and perform an activation function on operation-processed data by the PE array 430.

In this case, the activation function may use various algorithms, such as ReLU, tanh, sigmoid, and the like. Furthermore, the activation function may be configured in a lookup table form or may be configured in a micro-core form.

The special function units (SFUs) 490 may be matched with the respective activation function units 480 and perform additional operations in addition to the activation function. For example, the special function unit 490 may perform a processing operation, such as the element-wise multiplication of the LSTM.

The row level power controller 495 may perform clock gating control processing to the PE array 430 in a row unit.

As described above, the row level power controller 495 can perform the clock gating control processing in a row unit because the activation function unit 480 and the special function unit 490 are provided for each row. Accordingly, it is possible to reduce power consumption when performing a computing operation.

FIG. 12 illustrates a performance change according to a speed mode. Referring to FIG. 12, it may be seen that if the same power budget is used, performance of the MLP and LSTM applications is improved from P1 to P2 by appropriately changing a speed mode of a memory BW to a low speed mode or a high speed mode. FIG. 12 shows the MLP and the LSTM to which a high speed mode has been applied because a batch size is the reference value K or less. The reference value K has been described above with reference to FIG. 3.

Figure 13:
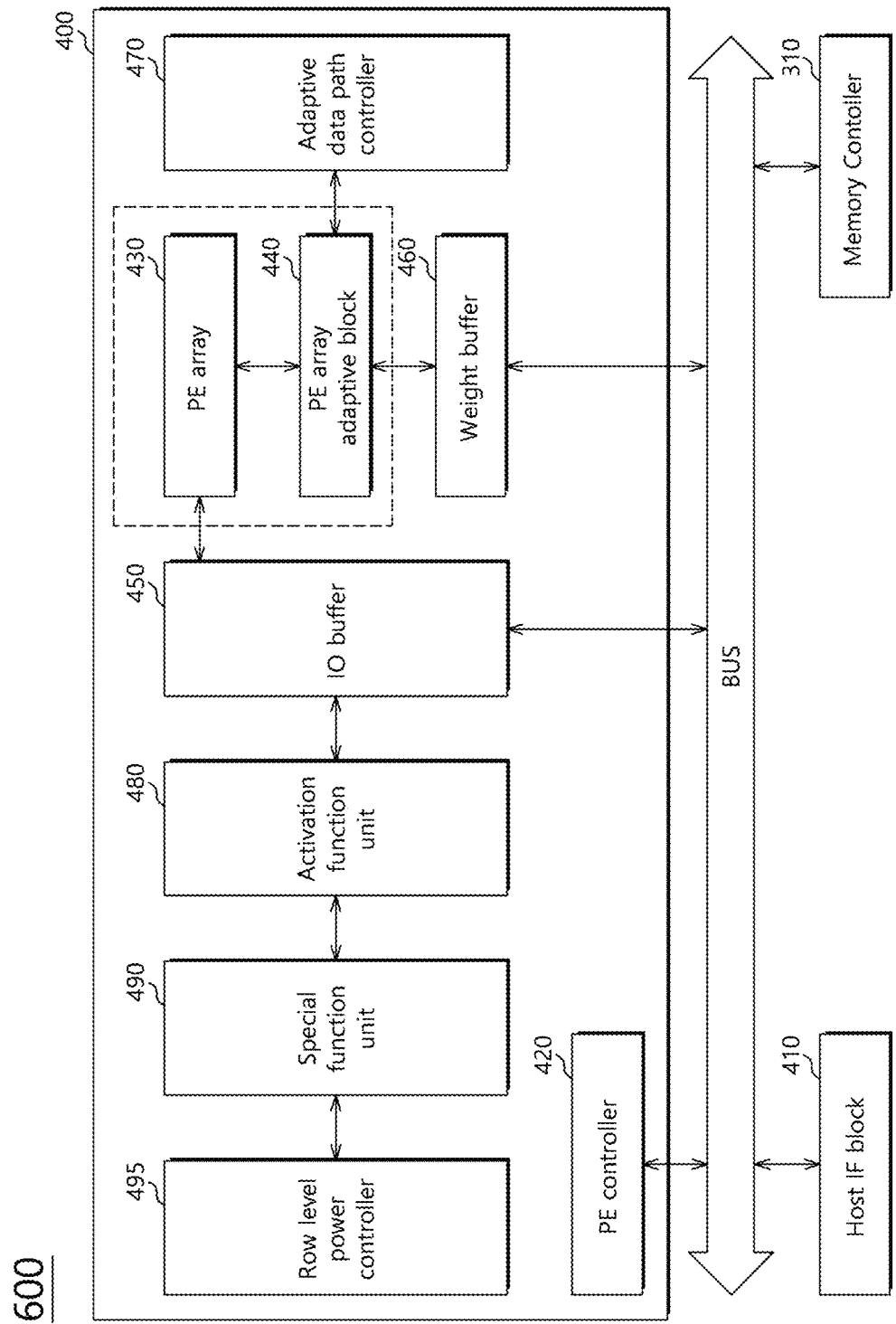
FIG. 13 illustrates an acceleration device according to an embodiment.

FIG. 13 illustrates an acceleration device 600 according to an embodiment.

Referring to FIG. 13, the acceleration device 600 may include an accelerator 400 for changing a structure of a processing element (PE) array 430 by controlling transmission paths of first input data and second input data of the PE array 430.

The accelerator 400 may perform an operation of receiving the first input data and the second input data, multiplying the first input data and the second input data, and adding the multiplied data to the previously stored data. In this case, the second input data may be weight data.

Referring back to FIG. 6, the first input data may be transmitted in the row direction, and the second input data may be transmitted in the column direction. The resulting data obtained by adding the multiplied data to the previously stored data includes all the second input data and the first input data that are necessary for a node, and is transmitted through an IO buffer 450. After the MAC is performed on the resulting data, an activation function unit (AFU) 480 performs an activation function on the data transmitted through the IO buffer 450 to thereby provide output data.

More specifically, the accelerator 400 may include a PE controller 420, the PE array 430, a PE array adaptive block 440, the IO buffer 450, a weight buffer 460, an adaptive data path controller 470, the AFU 480, a special function unit (SFU) 490, and a row level power controller 495.

The accelerator 400 may communicate with the host device 100 shown in FIGS. 1 and 2 through a host IF block 410. In this case, the host IF block 410 may interface between the host device 100 and the data storage device 200 shown in FIGS. 1 and 2 in which the accelerator 400 is included using a protocol of the host device 100. For example, the host IF block 410 may communicate with the host device 100 through a Serdes interface protocol, but the protocol is not limited thereto.

The PE controller 420 may transmit a speed mode of a memory BW, transmitted by the host device 100, to the adaptive data path controller 470.

The PE array adaptive block 440 may include a plurality of first multiplexers that are positioned between the PE arrays 430, and each first multiplexer may selectively input any one of first input data of a corresponding data group and first input data of another data group to PEs in the row direction within the PE array 430. In an embodiment, the PE array 430 includes a plurality of first PE groups, each first PE group including a multiplicity of PEs arranged in the row direction.

Furthermore, the PE array adaptive block 440 may include a plurality of second multiplexers that are positioned between the PE arrays 430, and each second multiplexer may selectively input any one of second input data of a corresponding data group and second input data of another data group to PEs in the column direction within the PE array 430. In an embodiment, the PE array 430 includes a plurality of second PE groups, each second PE group including a multiplicity of PEs arranged in the column direction.

The PE array adaptive block 440 may be positioned in a memory BW unit between the PE arrays 430.

Referring to FIG. 7, the PE array adaptive block 440 may include the plurality of first multiplexers 441 for inputting the first input data to PEs and the plurality of second multiplexers 443 for inputting the second input data to the PEs.

The plurality of first multiplexers 441 may be matched in a row unit of the PE array 430, and the plurality of second multiplexers 443 may be matched in a column unit of the PE array 430.

The IO buffer 450 may transmit the first input data to PEs in the row direction within the PE array 430.

The weight buffer 460 may transmit the second input data to PEs in the column direction within the PE array 430.

The adaptive data path controller 470 may control the input processing of the PE array adaptive block 440 based on a speed mode of a memory BW.

The speed mode of the memory BW may include a high speed mode and a low speed mode. In the high speed mode, the memory power is increased from an initial setting reference value. In the low speed mode, the computing power is increased from an initial setting reference value.

If the PE array 430 has an initial structure of an N×M structure as illustrated in FIG. 8, a memory BW is 2×, and the speed mode of the memory BW is the low speed mode, the adaptive data path controller 470 may control the input paths of the first input data and the second input data so that the structure of the PE array 430 is changed from the N×M structure to a 2N×M/2 structure shown in FIG. 9. N may be a batch size, and M may represent a weight width.

In particular, the adaptive data path controller 470 may control the plurality of first multiplexers 441 to receive the first input data from a second N data group of two or more N data groups, and may control the plurality of second multiplexers 443 to receive the second input data from an M/2 data group.

In contrast, if an initial structure of the PE array 430 is a 2N×M/2 structure as illustrated in FIG. 9, a memory BW is 2×, and the speed mode of the memory BW is the high speed mode, the adaptive data path controller 470 may control the input paths of the first input data and second input data so that the structure of the PE array 430 is changed from the 2N×M/2 structure to the N×M structure shown in FIG. 8.

The adaptive data path controller 470 may control the plurality of first multiplexers 441 to receive the first input data from the first N data group of the two or more N data groups, and may control the plurality of second multiplexers 443 to receive the second input data from a next M/2 data group following a first M/2 data group.

Figure 14:
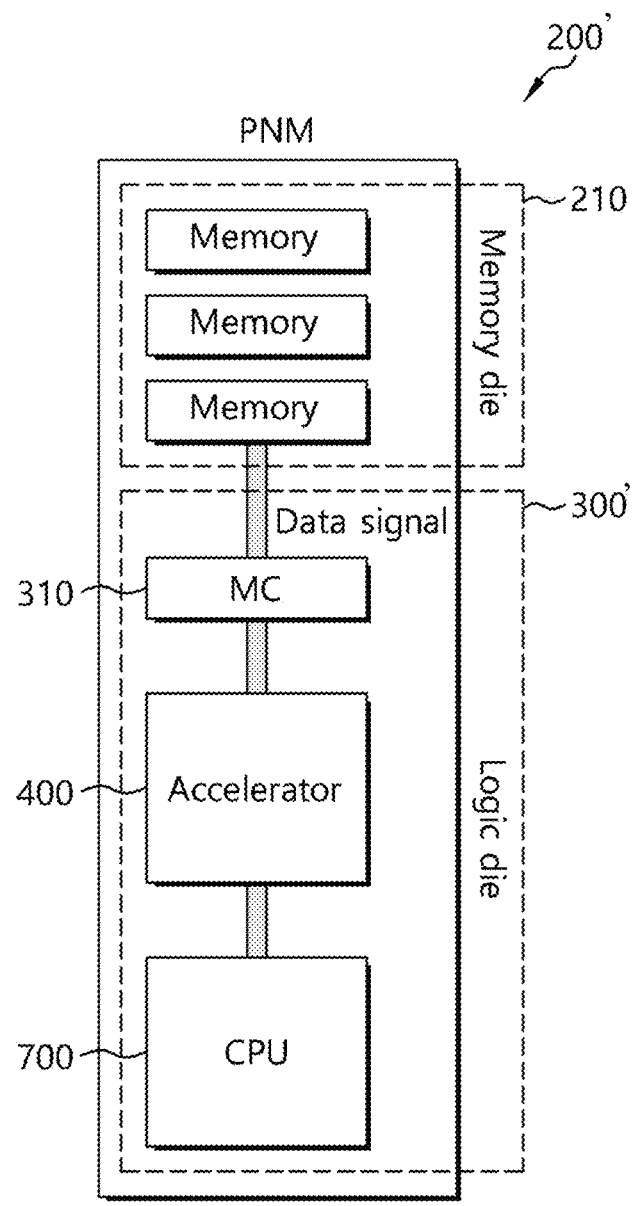
FIG. 14 illustrates a data storage device according to another embodiment.

FIG. 14 illustrates a data storage device 200' according to another embodiment.

The data storage device 200' may include a central processing unit (CPU) 700, an accelerator 400, a memory controller (MC) 310, and a plurality of memory dies 210. In this case, the MC 310, the accelerator 400, and the CPU 700 may be included in a logic die 300'.

The CPU 700 may determine a speed mode of a memory BW based on at least one of a network model and a batch size so that computing power and memory power of the accelerator 400 are adjusted in a total power budget. The speed mode of the memory BW may include a high speed mode in which the memory power is adjusted upward from an initial setting reference value and a low speed mode in which the computing power in the total power budget is adjusted upward from an initial setting reference value. In this case, the CPU 700 implements the function of the host device 100 disclosed in FIG. 2 within the data storage device 200. All the functions of the host device 100 may be applied to the CPU 700.

The CPU 700 may be electrically coupled to an external server (e.g., the external server 10 in FIG. 1) over a communication network, and may receive data from the external server 10. In this case, the data may include a batch size. The batch size may be included in PNM architecture information. Although not illustrated, the CPU 700 may include a wired interface or an interface for transmitting and receiving data to and from the external server 10.

The accelerator 400 may change a structure of a processing element (PE) array (e.g., the PE array 430 in FIG. 6) by controlling transmission paths of first input data and second input data of the PE array 430 based on the speed mode of the memory BW.

Referring to FIGS. 6 and 7, the accelerator 400 may include the PE controller (PE CTRL) 420, the PE array 430, the PE array adaptive block 440, the IO buffer 450, the weight buffer 460, the adaptive data path controller 470, the AFU 480, the SFU 490, and the row level power controller 495.

The PE controller 420 may transmit the speed mode of the memory BW, transmitted by the CPU 700, to the adaptive data path controller 470.

The PE array adaptive block 440 may be positioned between the PE arrays 430 and selectively input any one of first input data of a corresponding data group and first input data of another data group to PEs in the row direction within the PE array 430.

Furthermore, the PE array adaptive block 440 may be positioned between the PE arrays 430, and selectively input any one of second input data of a corresponding data group and second input data of another data group to PEs in the column direction within the PE array 430.

FIG. 6 illustrates the PE array 430 that has an N×M structure. In this case, N may be a batch size, and M may represent a weight width. That is, N may mean the number of PE rows in which the first input data is input. M may represent the number of PE columns in which the second input data is input.

Referring to FIGS. 7 and 10, the PE array adaptive block 440 may be positioned in a memory BW unit (e.g., a 1× unit) between PEs in the PE arrays 430, wherein a first PE array adaptive block is located in front of a second memory BW.

Referring to FIG. 7, the PE array adaptive block 440 may include the plurality of first multiplexers 441 for inputting the first input data to PEs and the plurality of second multiplexers 443 for inputting the second input data to the PEs.

The plurality of first multiplexers 441 may be matched in a row unit of the PE array 430, and the plurality of second multiplexers 443 may be matched in a column unit of the PE array 430.

The IO buffer 450 may transmit the first input data to PEs in the row direction within the PE array 430.

The weight buffer 460 may transmit the second input data to PEs in the column direction within the PE array 430.

Although not illustrated, the IO buffer 450 and the weight buffer 460 may be implemented into one element, or electrically coupled to each other by a bus.

The adaptive data path controller 470 may control the input processing of the PE array adaptive block 440 based on the speed mode of the memory BW.

If the PE array 430 has an initial structure of an N×M structure as illustrated in FIG. 8, the memory BW is 2×, and the speed mode of the memory BW is a low speed mode, the adaptive data path controller 470 may control the input paths of the first input data and the second input data so that the structure of the PE array 430 becomes a 2N×M/2 structure as illustrated in FIG. 9. In this case, N may be a batch size, and M may represent a weight width.

In contrast, if the initial structure of the PE array 430 is a 2N×M/2 structure as illustrated in FIG. 9, the memory BW is 2×, and the speed mode of the memory BW is a high speed mode, the adaptive data path controller 470 may control the input paths of the first input data and the second input data so that the structure of the PE array 430 becomes an N×M structure as illustrated in FIG. 8.

The activation function unit (AFU) 480 may be provided in each row of the PE array 430 and perform activation function processing on operation-processed data by the PE array 430.

The special function units (SFUs) 490 may be matched with the respective activation function units 480 and perform additional operations in addition to the activation function processing. For example, the special function unit 490 may perform a processing operation, such as the element-wise multiplication of the LSTM.

The row level power controller 495 may perform clock gating control processing on the PE array 430 in a row unit.

Referring to FIG. 11, the MC 310 may transmit the speed mode of the memory BW to the memory die 210.

The memory die 210 may change a clock of a memory based on the speed mode of the memory BW transmitted by the MC 310. In this case, the number of memory dies 210 may be at least one.

To change the clock of the memory based on the speed mode of the memory bandwidth may be directly processed by the MC 310. The data storage device 200 may be a processing near memory (PNM).

In the above embodiments disclosed, the computing power and the memory power are adjusted by controlling the input paths of the first input data and the second input data using the PE array adaptive block 440 including the plurality of first multiplexers 441 and the plurality of second multiplexers 443 when the memory BW is a 2× BW, but embodiments are not limited thereto.

In another embodiment, when the memory BW is the 2×BW, M second multiplexers arranged in the row direction may be disposed at an N/2 location in the column direction with the PE array 430 having the N×M structure, so that the PE array 430 is changed to an N/2×2M structure. In still another embodiment, when the memory BW is a 4×BW, M second multiplexers arranged in the row direction may be disposed at every N/4 location, i.e., N/4, 2N/4, and 3N/4 locations, in the column direction between PEs in the PE array 430 having the N×M structure, so that the PE array 430 is changed to an N/4×4M structure.

According to the present embodiments, performance of major applications for each network model can be improved because computing power and memory power are flexibly adjusted depending on a speed mode of a memory BW.

While various embodiments have been described above, it will be understood to those skilled in the art that the embodiments described are by way of example only. Accordingly, the system and device described herein should not be limited based on the described embodiments.

What is claimed is:

1. A data processing system comprising:
   a host device configured to select a speed mode of a memory bandwidth based on a network model, or a batch size, or both, computing power and memory power of an accelerator being adjusted according to the selection of the speed mode; and
   a data storage device comprising the accelerator configured to change a structure of a processing element (PE) array by controlling transmission paths of first input data and second input data that are input to the PE array based on the speed mode of the memory bandwidth,
   wherein the memory power in a total power budget is increased from an initial value of the memory power if a first speed mode is selected and the computing power in the total power budget is increased from an initial value of the computing power if a second speed mode is selected.

2. The data processing system according to claim 1, wherein the accelerator comprises:
   the PE array including a first PE group and a second PE group, each of the first and second PE groups including a plurality of PEs arranged in first and second directions;

a PE array adaptive block positioned between the first PE group and the second PE group in the PE array and configured to selectively input first input data of a first data group or first input data of a second data group to the second PE group in the first direction within the PE array and to selectively input second input data of a third data group or second input data of a fourth data group to the second PE group in the second direction within the PE array; and an adaptive data path controller configured to control input processing of the PE array adaptive block based on the speed mode of the memory bandwidth, and wherein the first speed mode is a high speed mode and the second speed mode is a low speed mode.

3. The data processing system according to claim 2, wherein the PE array adaptive block is positioned in a memory bandwidth unit between the first PE group and the second PE group in the PE array, wherein a first PE array adaptive block is positioned in front of a second memory bandwidth.

4. The data processing system according to claim 3, wherein the PE array adaptive block comprises:
a plurality of first multiplexers configured to input the first input data to the second PE group in the first direction, and
a plurality of second multiplexers configured to input the second input data to the second PE group in the second direction.

5. The data processing system according to claim 4, wherein the first direction is a row direction and the second direction is a column direction, and
wherein:
the plurality of first multiplexers are respectively matched with PEs arranged in a first column of the second PE group in the PE array, and
the plurality of second multiplexers are respectively matched with PEs arranged in a first row of the second PE group in the PE array.

6. The data processing system according to claim 5, wherein:
the adaptive data path controller controls an input path of the first input data and an input path of the second input data so that the structure of the PE array is changed to a 2N×M/2 structure when an initial structure of the PE array is an N×M structure, the memory bandwidth is 2×, and the speed mode of the memory bandwidth is the low speed mode,
the N is the batch size, and
the M is a weight width.

7. The data processing system according to claim 6, wherein the adaptive data path controller controls the plurality of first multiplexers to receive the first input data from 2N groups or more and controls the plurality of second multiplexers to receive the second input data from an M/2 group.

8. The data processing system according to claim 2, wherein the accelerator further comprises a PE controller configured to transmit the speed mode of the memory bandwidth, transmitted by the host device, to the adaptive data path controller.

9. The data processing system according to claim 2, wherein the accelerator further comprises a first level power controller configured to perform clock gating control processing on the PE array in a row unit.

10. The data processing system according to claim 2, wherein the accelerator further comprises:

an IO buffer configured to transmit the first input data to PEs in the first direction within the PE array; and
a weight buffer configured to transmit the second input data to PEs in the second direction within the PE array.

11. The data processing system according to claim 10, wherein the first direction is a row direction and the second direction is a column direction, and
wherein the accelerator further comprises:
an activation function unit provided in each row of the PE array and configured to perform activation function processing on operation-processed data by the PE array; and
a special function unit matched with the activation function unit and configured to perform an additional operation in addition to the activation function processing.

12. The data processing system according to claim 1, wherein the data storage device further comprises:
a memory controller configured to transmit the speed mode of the memory bandwidth to at least one memory die; and
the at least one memory die configured to change a clock of a memory based on the speed mode of the memory bandwidth transmitted by the memory controller.

13. The data processing system according to claim 1, wherein the data storage device comprises a processing-near-memory (PNM).

14. The data processing system according to claim 1, wherein the host device selects the speed mode of the memory bandwidth to be the second speed mode when the network model is a convolutional neural network (CNN).

15. The data processing system according to claim 1, wherein the host device compares the batch size with a reference value if the network model is any one of multi-layer perception (MLP) and a long short term memory (LSTM), determines the speed mode of the memory bandwidth as a low speed mode if the batch size exceeds the reference value, and determines the speed mode of the memory bandwidth as a high speed mode if the batch size is the reference value or less.

16. An acceleration device comprising:
an accelerator configured to change a structure of a processing element (PE) array by controlling transmission paths of first input data and second input data that are input to the PE array based on a speed mode of a memory bandwidth,
wherein the accelerator comprises:
the PE array including a first PE group and a second PE group, each of the first and second PE groups including a plurality of PEs arranged in first and second directions; and
a PE array adaptive block positioned between the first PE group and the second PE group in the PE array and configured to selectively input first input data of a first data group or first input data of a second data group to the second PE group in the first direction within the PE array and to selectively input second input data of a third data group or second input data of a fourth data group to the second PE group in the second direction within the PE array, and
wherein the accelerator further comprises an adaptive data path controller configured to control input processing of the PE array adaptive block based on the speed mode of the memory bandwidth, and
memory power in a total power budget is increased from an initial value of the memory power if a high speed mode is selected and computing power in the total power budget is increased from an initial value of the computing power if a low speed mode is selected.

17. The acceleration device according to claim 16, wherein the PE array adaptive block is positioned in a memory bandwidth unit between the first PE group and the second PE group in the PE array, wherein a first PE array adaptive block is positioned in front of a second memory bandwidth.

18. The acceleration device according to claim 17, wherein the PE array adaptive block comprises:
   a plurality of first multiplexers configured to input the first input data to the second PE group in the first direction; and
   a plurality of second multiplexers configured to input the second input data to the second PE group in the second direction.

19. The acceleration device according to claim 18, wherein the first direction is a row direction and the second direction is a column direction, and
   wherein:
   the plurality of first multiplexers are respectively matched with PEs arranged in a first column of the second PE group in the PE array, and
   the plurality of second multiplexers are respectively matched with PEs arranged in a first row of the second PE group in the PE array.

20. The acceleration device according to claim 19, wherein:
   the adaptive data path controller controls an input path of the first input data and an input path of the second input data so that the structure of the PE array is changed to a 2N×M/2 structure when an initial structure of the PE array is an N×M structure, the memory bandwidth is 2×, and the speed mode of the memory bandwidth is the low speed mode,
   the N is a batch size, and
   the M is a weight width.

21. The acceleration device according to claim 20, wherein the adaptive data path controller controls the plurality of first multiplexers to receive the first input data from 2N groups or more and controls the plurality of second multiplexers to receive the second input data from an M/2 group.

22. A data storage device comprising:
   a central processing unit (CPU) configured to select a speed mode of a memory bandwidth based on a network model, a batch size, or both, computing power and memory power of an accelerator being adjusted according to the selection of the speed mode; and
   the accelerator configured to change a structure of a processing element (PE) array by controlling transmission paths of first input data and second input data that are input to the PE array based on the speed mode of the memory bandwidth,
   wherein the memory power in a total power budget is increased from an initial value of the memory power if a first speed mode is selected and the computing power in the total power budget is increased from an initial value of the computing power if a second speed mode is selected.

23. The data storage device according to claim 22, wherein the accelerator comprises:
   the PE array including a first PE group and a second PE group, each of the first and second PE groups including a plurality of PEs arranged in first and second directions;
   a PE array adaptive block positioned between the first PE group and the second PE group in the PE array and configured to selectively input first input data of a first data group or first input data of a second data group to the second PE group in the first direction within the PE array and to selectively input second input data of a third data group or second input data of a fourth data group to the second PE group in the second direction within the PE array; and
   an adaptive data path controller configured to control input processing of the PE array adaptive block based on the speed mode of the memory bandwidth.

24. The data storage device according to claim 23, wherein the PE array adaptive block comprises:
   a plurality of first multiplexers configured to input the first input data to the second PE group in the first direction; and
   a plurality of second multiplexers configured to input the second input data to the second PE group in the second direction.

25. The data storage device according to claim 23, wherein the accelerator further comprises a PE controller configured to transmit the speed mode of the memory bandwidth, transmitted by the CPU, to the adaptive data path controller.

26. The data storage device according to claim 22, further comprising:
   a memory controller configured to transmit the speed mode of the memory bandwidth to at least one memory die; and
   the at least one memory die configured to change a clock of a memory based on the speed mode of the memory bandwidth transmitted by the memory controller.

* * * * *